Nov. 18, 1941.                G. A. PAGE, JR                2,263,427
                       RETRACTABLE LANDING GEAR
                       Original Filed Oct. 27, 1934

INVENTOR
GEORGE A. PAGE JR.
BY
ATTORNEY

Patented Nov. 18, 1941

2,263,427

UNITED STATES PATENT OFFICE 2,263,427

RETRACTABLE LANDING GEAR

George A. Page, Jr., Overland, Mo., assignor to Curtiss-Wright Corporation, a corporation of Delaware Original application October 27, 1934, Serial No. 750,286. Divided and this application October 18, 1938, Serial No. 235,581

3 Claims. (Cl. 244—102)

This application relates to aircraft retractable landing gears, and comprises a division of a copending application Serial No. 750,286, filed October 27, 1934, and entitled Retractable landing gear.

An object of the invention is to provide means for preventing landing wheel rotation during flight and further, to prevent the rotation of retracted landing wheels particularly when the landing gear organization is such that a part of the periphery of the landing wheel is exposed when retracted.

A further object is to provide means automatically operable in response to retraction of the landing gear for braking the wheel thereof and for preventing its rotation.

Further objects will be apparent from a reading of the annexed specification and claims, together with an examination of the accompanying drawing, in which:

Figure 1:
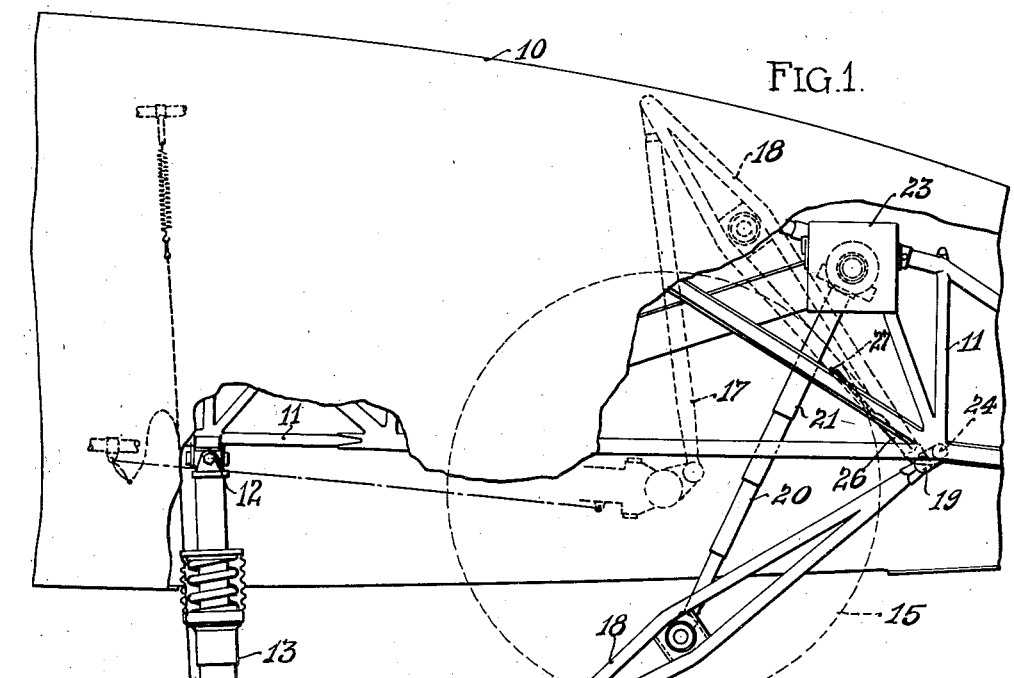
Fig. 1 is a side elevation of an aircraft body, partly broken away, and including a landing gear and the provisions of the invention.
Figure 2:
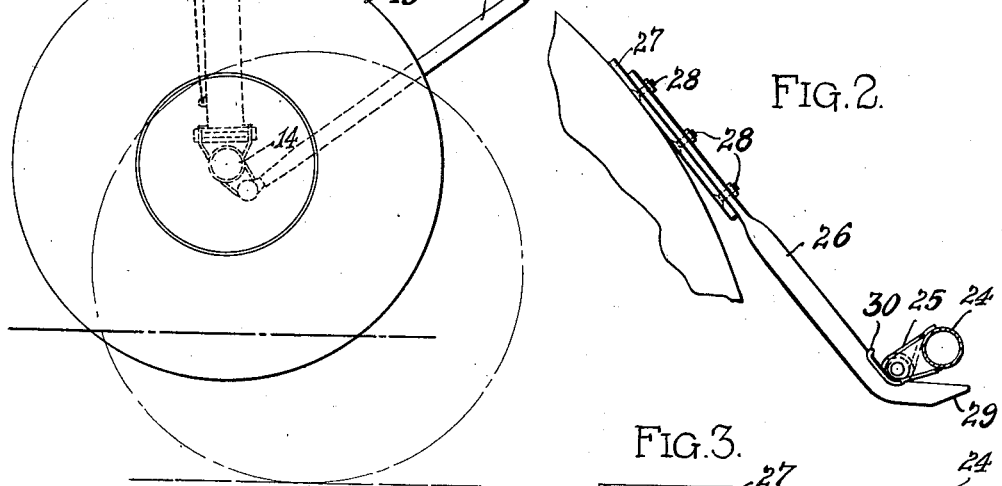
Fig. 2 is an enlarged side elevation of a portion of the airplane wheel and of the wheel brake for preventing rotation of the wheel when retracted.
Figure 3:
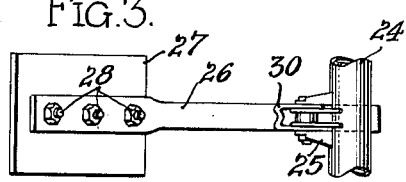
Fig. 3 is a plan of the brake of Fig. 2.

The complete structure of the landing gear is described in detail in said copending application, but for the purpose of clearly describing the present invention it is necessary only to show the nacelle 10 having structure 11 to which is pivoted, at 12, a main landing gear shock absorbing strut 13 on the lower end of which, at 14, a wheel 15 is journaled. The strut 13 is swingable rearwardly and upwardly to the dotted line position by means of a buckling strut comprising two parts 17 and 18 hinged to one another and respectively hinged to the axle 14 and the structure 11 as at 19. Buckling of the strut is effected by means of a screw-shaft 20 shown as being covered with a telescoping housing 21, the screwshaft being rotatable in either direction through gears in a gear box 23 driven by suitable manual or power mechanism, not shown. Within the nacelle and attached to a cross brace 24 of the nacelle structure 11, is a bracket 25 more clearly shown in Figs. 2 and 3, to which is hinged an arm 26 having a shoe 27 attached as by bolts 28 or their equivalent. The lower part of the arm 26, indicated at 29, is bent to form a stop adapted to rest against the brace 24 to limit the downward movement of the arm when the wheel is not in contact with the shoe 27. A spring 30 serves to urge the arm toward a downward position. Upon retraction of the landing gear the periphery of the wheel 15 engages the shoe 27 whereby rotation of the wheel within the nacelle is stopped and is further prevented during flight. Without the brake it would be possible for the wheel 15 to rotate continually when retracted since the lower portion of the wheel, as shown, is continually exposed to the fast moving airstream below the nacelle. When the wheel is extended, it moves out of contact with the shoe 27 and is free thereafter to rotate, either due to action of the airstream or to ground contact when landing, the shoe 27 with its supporting structure remaining within the nacelle and being wholly inoperative when the landing gear is extended.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In aircraft including a body having an opening in a lower surface thereof, a landing wheel, mechanism operable to extend said wheel below the body and to retract the wheel into the body through said opening, said wheel when retracted lying principally within the body but having the lowermost part of its periphery lying without the body confines and exposed to the airstream whereby the airstream tends to rotate the retracted wheel, and a brake shoe resiliently secured wholly within the body organized to be engaged by the wheel after partial retraction and entry thereof into the body to hold the wheel against rotation.

2. In aircraft including a body having an opening in a lower surface thereof, a landing wheel, mechanism operable to extend said wheel below the body and to retract the wheel into the body through said opening, said wheel when retracted lying principally within the body but having the lowermost part of its periphery lying without the body confines and exposed to the airstream whereby the airstream tends to rotate the retracted wheel, and a brake shoe resiliently secured wholly within the body organized to be engaged by the wheel after partial retraction and entry thereof into the body to hold the wheel against rotation, said shoe comprising an arm secured thereto and pivoted within the aircraft.

3. In aircraft including a body having a bottom recess and a landing gear including a wheel and means for extending the wheel below and clear of the body and for retracting the wheel into the body into said recess, the recess being open except for such closure as the retracted wheel may afford, and the wheel, when retracted, protruding from the body, an arm hinged for swinging within the body and having limited freedom of movement, stop means to limit arm movement so that the arm is at all times retained within the confines of the body, a brake shoe on the arm adapted to be engaged by the wheel as the latter is retracted, and spring means acting between the arm and the body urging the arm and shoe into wheel contact.

GEORGE A. PAGE, Jr.